United States Patent
Nakamura et al.

(10) Patent No.: US 12,447,858 B2
(45) Date of Patent: Oct. 21, 2025

(54) BATTERY CHARGE MANAGEMENT DEVICE

(71) Applicant: TOYOTA JIDOSHA KABUSHIKI KAISHA, Aichi-ken (JP)

(72) Inventors: Taiki Nakamura, Kariya (JP); Shinya Hirosawa, Nisshin (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 224 days.

(21) Appl. No.: 18/452,569

(22) Filed: Aug. 21, 2023

(65) Prior Publication Data

US 2024/0067042 A1 Feb. 29, 2024

(30) Foreign Application Priority Data

Aug. 31, 2022 (JP) .................. 2022-137702

(51) Int. Cl.
*B60L 58/12* (2019.01)
*H02J 7/00* (2006.01)

(52) U.S. Cl.
CPC .......... *B60L 58/12* (2019.02); *H02J 7/0047* (2013.01); *B60L 2240/545* (2013.01); *B60L 2240/62* (2013.01); *B60L 2250/16* (2013.01)

(58) Field of Classification Search
CPC ............ B60L 58/12; B60L 2240/545; B60L 2240/62; B60L 2250/16; B60L 53/00; B60L 53/30; B60L 2240/60; B60L 2260/50; B60L 2260/52; B60L 2260/54; H02J 7/0047; Y02T 10/70; Y02T 10/7072; Y02T 90/12
See application file for complete search history.

(56) References Cited

U.S. PATENT DOCUMENTS

| | | |
|---|---|---|
| 2010/0169008 A1 | 7/2010 | Niwa et al. |
| 2014/0032102 A1 | 1/2014 | Egoshi |
| 2022/0049966 A1 | 2/2022 | Kodama et al. |

FOREIGN PATENT DOCUMENTS

| | | | |
|---|---|---|---|
| JP | 2009030993 A | | 2/2009 |
| JP | 2010-230499 A | | 10/2010 |
| JP | 2012-198081 A | | 10/2012 |
| JP | 2013-113770 A | | 6/2013 |
| JP | 2021-063766 A | | 4/2021 |
| JP | 2021063766 | * | 4/2021 |
| JP | 2022032373 A | | 2/2022 |
| WO | 2012/133670 A1 | | 10/2012 |

OTHER PUBLICATIONS

Machine Translation of (Year: 2021).*

* cited by examiner

*Primary Examiner* — Alan D Hutchinson
(74) *Attorney, Agent, or Firm* — HAUPTMAN HAM, LLP (57) ABSTRACT

The charge information includes at least one of an estimated increase amount of a charge level of the battery, an estimated charge level of the battery after charging, and a travelable distance of the vehicle corresponding to the estimated charge level.

10 Claims, 3 Drawing Sheets

BATTERY CHARGE MANAGEMENT DEVICE

RELATED APPLICATION

The present application claims priority of Japanese Patent Application No. 2022-137702 filed on Aug. 31, 2022, the disclosure of which is hereby incorporated by reference herein in its entirety.

BACKGROUND

1. Field

The present disclosure relates to a battery charge management device.

2. Description of Related Art

Japanese Laid-Open Patent Publication No. 2022-32373 discloses a vehicle having a battery that can be charged by an external power supply. In this type of vehicle, the battery can be charged at a charging station, which is a facility for supplying electric power. In the technique disclosed in the patent document described above, during charging of the battery at the charging station, the charging station uses a display or the like to provide information on the surroundings of a destination to which the vehicle is going.

For example, when the user considers charging at a charging station while the vehicle is traveling, if the user can obtain information such as the location of the charging station and an increase amount of the charge level of the battery when charged at the charging station, the user can easily make a subsequent travel plan. The technique described in the patent document described above does not consider this point, and there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a battery charge management device configured to manage a battery for driving a vehicle. The battery is configured to be charged by an external power supply at a charging station. The battery charge management device includes processing circuitry and a storage device. The storage device stores in advance map data including position information of a plurality of charging stations and a correspondence relationship between a charge level of the battery and a charging time of the battery. The processing circuitry is configured to execute: a first process that retrieves, from the map data, one or more of the charging stations located in a predetermined target area including a current position of the vehicle, the one or more of the charging stations being one or more specified stations; a second process that calculates set charge information based on the correspondence relationship, the set charge information being charge information obtained based on an assumption that the battery has been charged at the one or more specified stations for a predetermined set charging time; and a third process that outputs the set charge information together with the position information of the one or more specified stations. The charge information includes at least one of an estimated increase amount of the charge level of the battery, an estimated charge level of the battery after charging, and a travelable distance of the vehicle corresponding to the estimated charge level.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Figure 1:
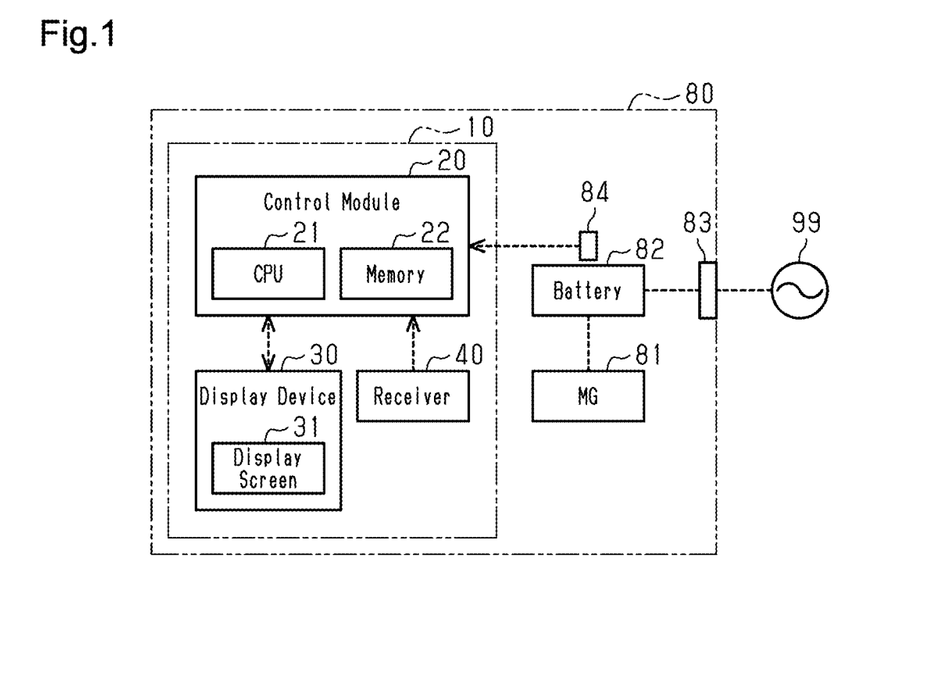
FIG. 1 is a schematic configuration diagram of a vehicle.

Hereinafter, an embodiment of a battery charge management device will be described with reference to the drawings. As shown in FIG. 1, a vehicle 80 includes a motor generator 81, a battery 82, a connector 83, and a battery monitoring device 84. The motor generator 81 is a drive source for the vehicle 80. The battery 82 is used for driving the vehicle 80. The battery 82 transfers electric power to and from the motor generator 81. The connector 83 is connected to the battery 82. The connector 83 can be connected to an external power supply 99. When the external power supply 99 is connected to the connector 83, the battery 82 can be charged with power supplied from the external power supply 99. The battery monitoring device 84 detects information of the battery 82. The information of the battery 82 includes the temperature of the battery 82, the voltage of the battery 82, and the current flowing through the battery 82. The battery monitoring device 84 repeatedly transmits the detected information to a control module 20, which is described below.

The vehicle 80 includes a charge management device 10 for the battery 82. The charge management device 10 includes the control module 20, a display device 30, and a receiver 40. The control module 20 includes a CPU 21, which is an execution device, and a memory 22, which is a storage device. The memory 22 includes random access memory (RAM), read only memory (ROM), and an electrically rewritable nonvolatile memory. The memory 22 stores program codes or instructions configured to cause the CPU 21 to execute processes. The memory 22, or a computer readable medium, includes any type of medium that is accessible by a general-purpose computer and a dedicated computer. The CPU 21 includes a circuit that generates date and time information.

The display device 30 is, for example, a touch panel type liquid crystal display. That is, the display device 30 also serves as an input device. The display device 30 includes a display screen 31. The display screen 31 is located in the passenger compartment. The display device 30 is connected to the control module 20. The display device 30 displays an image corresponding to information output from the CPU 21 of the control module 20 on the display screen 31. When the user performs an input operation on the display screen 31, the display device 30 outputs information corresponding to the input operation to the control module 20.

The receiver 40 receives information on the current position coordinates of the vehicle 80 from a global positioning satellite. The receiver 40 repeatedly transmits the received information to the control module 20. The position coordinates are latitude and longitude.

The control module 20 manages the charging of the battery 82. The CPU 21 can execute a display process for displaying information related to charging of the battery 82. The CPU 21 always acknowledges the present charge level S [%] of the battery 82 as information used for executing the display process. The charge level S of the battery 82 is a value obtained by expressing the ratio of the state of charge [Ah] of the battery 82 to the charging capacity [Ah] of the battery 82 in percentage. The CPU 21 calculates the present charge level S of the battery 82 based on various parameters detected by the battery monitoring device 84. For example, the CPU 21 calculates the charging capacity and the state of charge based on the voltage and the temperature of the battery 82.

The memory 22 stores map data in advance as information used in the display process. The map data includes information on a plurality of nodes and a plurality of links. Each node indicates position coordinates. Each link is defined as a line segment connecting adjacent nodes. Each link represents a road. The map data also includes information on a plurality of charging stations. Information on a specified charging station includes an identification value ID assigned to the charging station, the position coordinates of the charging station as the position information of the charging station, and a power supply amount of the external power supply 99 installed in the charging station. The power supply amount is an amount [W] of power that can be supplied from the external power supply 99 to the battery 82 per unit time.

Figure 2:
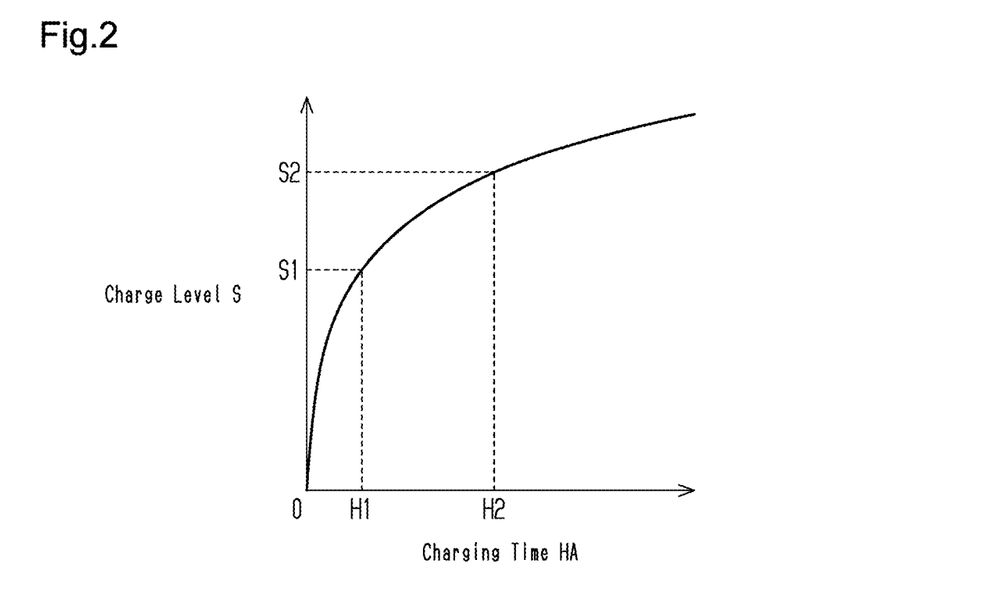
FIG. 2 is a diagram illustrating an example of a charging map.

The memory 22 stores a charging map in advance as information used in the display process. As shown in FIG. 2, the charging map represents a correspondence relationship between the charge level S of the battery 82 and a charging time HA of the battery 82. Specifically, the charging map represents a transition of the charge level S of the battery 82 according to the charging time HA. An increase amount of the charge level S when the battery 82 is charged for a certain unit time is referred to as charging efficiency. In the charging map, as the charge level S increases, the charging efficiency decreases. The charging map is created based on, for example, an experiment or a simulation in which a reference amount of power is supplied to the battery 82 per unit time when the battery 82 is in a new state and the battery 82 is at a reference temperature. The reference temperature is the maximum temperature that the battery 82 can have during use of the battery 82. The reference power amount is the upper limit value of the power supply amount. The reference power amount is also the maximum value of the power amount per unit that can be received by the battery 82. The memory 22 stores the reference temperature and the reference power amount in advance.

The CPU 21 starts the display process related to charging of the battery 82 in response to a user's operation on the display screen 31. When starting the display process, the CPU 21 sets an initial charging time HU stored in the memory 22 as an initial value of a set charging time H described later. The initial charging time HU is determined in advance as a standard length of time for charging at a charging station and is, for example, 30 minutes.

Figure 3:
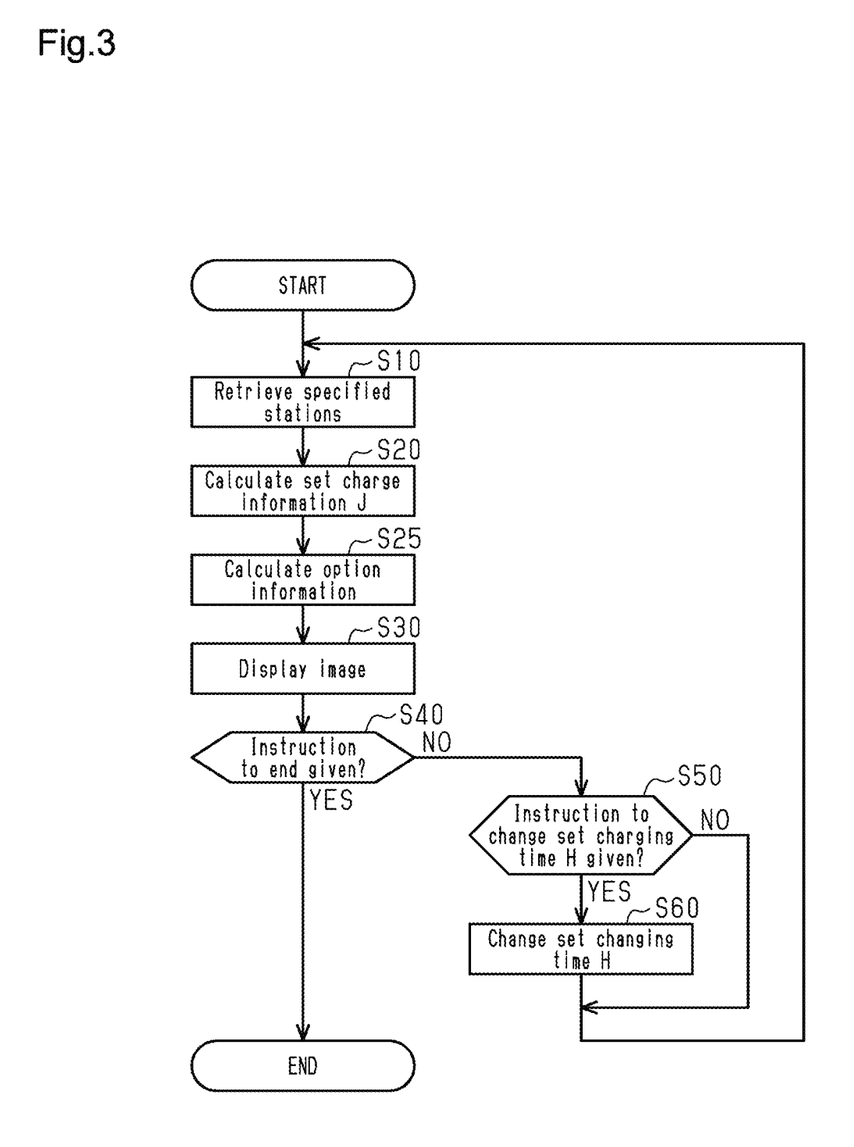
FIG. 3 is a flowchart illustrating a processing procedure of a display process.

As shown in FIG. 3, when starting the display process, the CPU 21 first performs the process of step S10. The process of step S10 corresponds to a first process. In step S10, the CPU 21 retrieves charging stations that are candidates for the vehicle 80 to charge the battery 82. More particularly, the CPU 21 refers to the map stored in the memory 22. Then, the CPU 21 sets a virtual circle around the current position of the vehicle 80 on the map data. Then, the CPU 21 sets the range of the virtual circle as a target area and retrieves the charging stations located in the target area as specified stations. The radius of the virtual circle is the maximum distance that the vehicle 80 can travel from the current position without being charged at the present charge level S of the battery 82. The maximum distance is determined in advance in accordance with the charge level S. Based on a set charge level K stored in the memory 22, the CPU 21 converts the present charge level S of the battery 82 into a distance that can be traveled by the vehicle 80 in the current state. The CPU 21 treats this distance as the radius of the imaginary circle. The set charge level K is a charge level S of the battery 82 consumed by the vehicle 80 when traveling a unit distance at a travel speed that can be considered to be general to a certain extent. The set charge level K is determined in advance by, for example, an experiment or a simulation. The travel speed of the vehicle 80 that can be considered to be general to some extent is, for example, 30 km/h on a general road and 80 km/h on an expressway. Upon retrieving the specified stations, the CPU 21 proceeds to step S20. When there is no charging station in the target area, the CPU 21 displays such a message on the display screen 31 and ends the display process.

In step S20, the CPU 21 calculates set charge information J. The set charge information J is charge information obtained based on an assumption that the battery 82 has been charged at the specified station for the set charging time H. The charge information includes, for example, an estimated increase amount ΔS that is an increase amount of the charge level S of the battery 82, an estimated charge level F that is the charge level S of the battery 82 after charging, and a travelable distance D of the vehicle 80 corresponding to the estimated charge level F. The set charging time H is a charging time for which the set charge information J is calculated. The CPU 21 calculates the set charge information J for a set charging time H that is set at a point in time when step S20 is executed. When a plurality of specified stations is retrieved in step S10, the CPU 21 calculates the set charge information J for each of the retrieved specified stations. An example of a method for calculating the set charge information J for a specified station will be described.

First, the CPU 21 calculates an arrival charge level, which is the charge level S when the vehicle 80 arrives at the specified station in the future. The CPU 21 refers to the map data stored in the memory 22 when calculating the arrival charge level. Then, the CPU 21 calculates a normal travel distance of the vehicle 80 from the current position to the specified station. The normal travel distance may be a distance of a travel route when the vehicle 80 travels from the current position to the specified station based on the shortest distance, or may be a distance of a travel route when the vehicle 80 travels from the current position to the specified station based on the shortest time. Next, the CPU 21 calculates a decrease charge level, which is the charge level of the battery 82 that is consumed by the vehicle 80 when traveling the travel distance. The CPU 21 converts the travel distance into the decrease charge level based on the set charge level K stored in the memory 22. Subsequent to the calculation of the decrease charge level, the CPU 21 sets the arrival charge level to a value obtained by subtracting the decrease charge level from the present charge level S.

Subsequent to the calculation of the arrival charge level, the CPU 21 calculates the estimated increase amount ΔS, which is one type of the charge information. More specifically, the CPU 21 refers to the charging map stored in the memory 22. As shown in FIG. 2, for example, when the arrival charge level is a first charge level S1, the CPU 21 specifies that the charging time HA corresponding to the first charge level S1 is a first value H1 in the charging map. Then, the CPU 21 specifies that the value obtained by adding the set charging time H to the first value H1 is a second value H2. Then, in the charging map, the CPU 21 calculates a second charge level S2, which is the charge level S when the charging time HA is the second value H2, as a target charge level. Subsequent to the calculation of the target charge level, the CPU 21 calculates a value by subtracting the arrival charge level from the target charge level as a tentative increase level. Subsequent to the calculation of the tentative increase level, the CPU 21 calculates a first correction coefficient for correcting the tentative increase level. The first correction coefficient is a positive value that is less than or equal to one. The CPU 21 changes the first correction coefficient in accordance with the amount of power supplied from the specified station. The CPU 21 calculates the first correction coefficient to be a smaller value as the power supply amount is decreased from the reference power amount, where the first correction coefficient is one when the power supply amount is equal to the reference power amount. Subsequent to the calculation of the first correction coefficient, the CPU 21 calculates the product of the first correction coefficient and the tentative increase level as the estimated increase amount ΔS. In accordance with the setting of the first correction coefficient, the estimated increase amount ΔS for the same set charging time H is increased as the power supply amount is increased.

Subsequent to the calculation of the estimated increase amount ΔS, the CPU 21 calculates the estimated charge level F, which is one type of the charge information. More specifically, the CPU 21 calculates the sum of the arrival charge level and the estimated increase amount ΔS as the estimated charge level F.

Subsequent to the calculation of the estimated charge level F, the CPU 21 calculates the travelable distance D, which is one type of the charge information. When calculating the travelable distance D, the CPU 21 first calculates a tentative travel distance, which is a tentative value of the travelable distance D. More specifically, the CPU 21 calculates a distance that can be traveled by the vehicle 80 at the charge level S of the battery 82 corresponding to the estimated charge level F as the tentative travel distance based on the set charge level K. Subsequent to the calculation of the tentative travel distance, the CPU 21 calculates a second correction coefficient for correcting the tentative travel distance. The second correction coefficient is a positive value that is less than or equal to one. When calculating the second correction coefficient, the CPU 21 first calculates the number of elapsed days from the initial day stored in the memory 22 to the present day. The initial day is, for example, a date on which the vehicle 80 was first driven using the battery 82 in a new state. The number of elapsed days is an index indicating the deterioration level of the battery 82. A greater number of elapsed days indicates that the deterioration level is high. The CPU 21 changes the second correction coefficient in accordance with the number of elapsed days and the latest temperature of the battery 82 detected by the battery monitoring device 84. More specifically, the CPU 21 calculates the second correction coefficient as follows. The CPU 21 sets the second correction coefficient to one when the number of elapsed days is zero and the current temperature of the battery 82 is the reference temperature. When the temperature of the battery 82 is the same, the CPU 21 calculates the second correction coefficient to be a smaller value as the number of elapsed days is increased. When the number of elapsed days is the same, the CPU 21 calculates the second correction coefficient to be a smaller value as the temperature of the battery 82 is decreased. Subsequent to the calculation of the second correction coefficient, the CPU 21 calculates the product of the second correction coefficient and the tentative travel distance as the final travelable distance D. The travelable distance D includes an increased travel distance, which is an increase range of the travel distance according to the estimated increase amount ΔS. The increased travel distance corresponds to the product of the estimated increase amount ΔS and the second correction coefficient. As the second correction coefficient is defined, when the set charging time H is the same, the increased travel distance is decreased as the number of days elapsed is increased from the point in time when the battery 82 is new. In addition, when the set charging time H is the same, the increased travel distance is decreased as the temperature of the battery 82 becomes lower during the execution of step S20. The process of step S20 corresponds to a second process.

The CPU 21 calculates the set charge information J as described above. Subsequent to the calculation of the set charge information J for each specified station, the CPU 21 proceeds to step S25 as shown in FIG. 3.

In step S25, the CPU 21 calculates various kinds of option information. When a specified station is the start point, the charge level S of the battery 82 needed for traveling from the start point to a destination of the vehicle 80 is referred to as a necessary charge level. The time taken to increase the charge level S of the battery 82 to the necessary charge level using the external power supply 99 at the specified stations being the start point is referred to as a necessary time N. Further, the time taken to charge the battery 82 from the present charge level S to the charging capacity is referred to as a maximum time M.

In step S25, the CPU 21 first causes the display screen 31 to display a message prompting the user to input a destination of the vehicle 80. When the destination is input, the CPU 21 starts calculation of the necessary time N. For example, in a case where the CPU 21 has already obtained the destination in relation to travel route guidance or the like, the CPU 21 immediately starts calculation of the necessary time N. When a plurality of specified stations is retrieved in step S10, the CPU 21 calculates the necessary time N for each of the retrieved specified stations. An example of a method for calculating the necessary time N for a specified station will be described.

First, the CPU 21 calculates the travel distance of the vehicle 80 from the specified station to the destination based on the map stored in the memory 22. In an example, the CPU 21 sets a necessary travel distance to a value obtained by adding 10% of the travel distance to the travel distance. Then, the CPU 21 converts the necessary travel distance into the consumption charge level of the battery 82 using the set charge level K. The CPU 21 uses the consumption charge level as the necessary charge level. Therefore, the process of step S25 corresponds to a sixth process.

Next, the CPU 21 refers to the arrival charge level calculated in step S20. When the arrival charge level is greater than or equal to the necessary charge level, the CPU 21 calculates the necessary time N as zero. When the arrival charge level is less than the necessary charge level, the CPU 21 calculates the time taken to increase the charge level S of the battery 82 from the arrival charge level to the necessary charge level as a tentative time. At this time, the CPU 21 uses the charging map. As shown in FIG. 2, for example, it is assumed that the necessary charge level is the second charge level S2 and the arrival charge level is the first charge level S1. In this case, the CPU 21 uses the difference between the second value H2, which is the charging time HA corresponding to the second charge level S2, and the first value H1, which is the charging time HA corresponding to the first charge level S1, as the tentative time. After calculating the tentative time, the CPU 21 calculates a third correction coefficient for correcting the tentative time. The third correction coefficient is a positive value equal to or greater than "1". The CPU 21 changes the third correction coefficient in accordance with the amount of power supplied to the specified station. The CPU 21 sets "1" when the supplied power amount is equal to the reference power amount, and calculates the third correction coefficient as a larger value as the supplied power amount is smaller than the reference power amount. After calculating the third correction coefficient, the CPU 21 calculates the product of the third correction coefficient and the tentative time as the necessary time N. Therefore, the process of step S25 is a seventh process.

In step S25, the CPU 21 calculates the maximum time M. CPU 21 calculates the maximum time M for each specified station retrieved in step S10 in the same manner as the necessary time N. The CPU 21 uses a charging map to calculate the maximum time M. For example, as shown in FIG. 2, it is assumed that the present charge level S is the second charge level S2. In this case, the CPU 21 uses the difference between the second value H2 of the charging time HA and the charging time HA when the charge level S is 100 [%] as the tentative value of the maximum time M. The CPU 21 calculates the product of the tentative value and the third correction coefficient determined for each specified station as the maximum time M. When the necessary time N and the maximum time M are calculated in this way, the CPU 21 advances the processing to step S30 as shown in FIG. 3.

Figure 4:
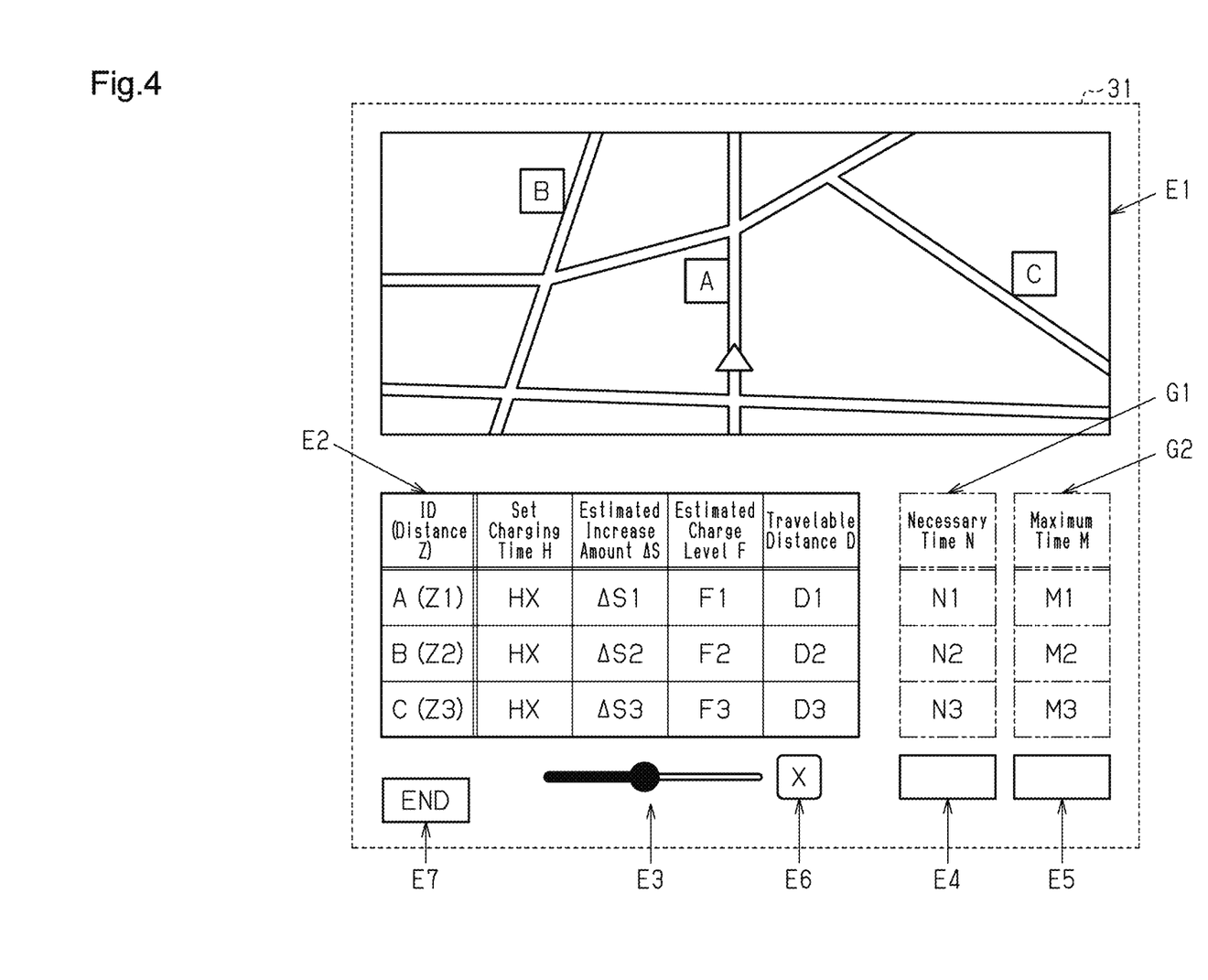
FIG. 4 is a diagram illustrating an example of display contents by the display process.

In step S30, the CPU 21 causes the display device 30 to display various images in combination. In particular, the CPU 21 generates a first image E1, as shown in FIG. 4. The first image E1 is an image in which the road existing around the vehicle 80, the current position of the vehicle 80 on the road, and the position of the specified station are collected. The CPU 21 uses a mark such as a triangle that can be distinguished from other objects as a plot indicating the current position of the vehicle 80. The CPU 21 uses, for example, the identification value ID of the specified station as a plot indicating the position of the specified station.

The CPU 21 generates a second image E1 in addition to the first image E2. The second image E2 shows the set charge information J of the specified station in the form of a table. For example, in the second image E2, the CPU 21 arranges the set charging time H, the estimated increase amount ΔS, the estimated charge level F, and the travelable distance D side by side in association with the identification value ID of the specified station. When a plurality of specified stations are retrieved in step S10, the CPU 21 arranges the specified stations from the top in the order of proximity to the current position of the vehicle 80. The second image E2 also includes information on the distance Z from the current position of the vehicle 80 to the specified station.

In step S30, the CPU 21 generates various images in addition to the first image E1 and the second image E2. In particular, the CPU 21 generates the third image E3 for selecting the set charging time H. The third image E3 is an icon in which a straight line and a point movable on the straight line are combined. The user can select one of a plurality of predetermined times as the set charging time H by touching the display screen 31 of the display device 30 and moving the point on a straight line. For example, the plurality of times are determined in increments of 10 minutes with 10 minutes as the minimum. That is, the plurality of times are different from each other. Until step S50 described later is executed, the third image E3 is an image in which the point is located at a position corresponding to the initial charging time HU on the straight line.

The CPU 21 generates a fourth image E4. The fourth image E4 is an icon for instructing display of the necessary time N. The CPU 21 generates a fifth image E5. The fifth image E5 is an icon for instructing display of the maximum time M. Further, the CPU 21 generates a sixth image E6. The sixth image E6 is an icon for instructing to delete the third image E3 to the fifth image E5 from the screen. The CPU 21 also generates a seventh image E7. The seventh image E7 is an icon for instructing the end of the display processing.

The CPU 21 generates a first option image G1. The first option image G1 shows the necessary time N of the specified station in the form of a table. When a plurality of specified stations are retrieved in step S10, the CPU 21 arranges the necessary time N from the top in order of proximity to the current position of the vehicle 80. The CPU 21 generates a second option image G2. The second option image G2 shows the maximum time M of the specified station in the form of a table. When a plurality of specified stations are retrieved in step S10, the CPU 21 arranges the maximum times M from the top in the order of proximity to the current position of the vehicle 80.

When the first image E1 to the sixth image E6, the first option image G1, and the second option image G2 are generated, the CPU 21 integrates these images into one image and outputs the image to the display device 30. At this time, the CPU 21 adjusts the arrangement of the second image E2 and the first option image G1 so that the necessary time N of a certain specified station is arranged side by side with the identification value ID and the set charge information J of the corresponding specified station. In addition, the CPU 21 adjusts the arrangement of the second image E2 and the second option image G2 so that the maximum time M of a certain specified station is arranged side by side with the identification value ID and the set charge information J of the corresponding specified station.

In addition, the CPU 21 switches display and non-display of the first option image E4 every time the user touches the fourth image G1 during execution of the display processing. Similarly, the CPU 21 switches between display and non-display of the second option image E5 every time the user touches the fifth image G2 during execution of the display processing.

The first image E1 includes position information of the specified station. The second image E2 includes the set charge information J. Therefore, the process of step S30 corresponds to a third process. The third image E3 is an icon for selecting the set charging time H. Therefore, the process of step S30 corresponds to a fourth process. Further, the first option image G1 includes the necessary time N. Therefore, the process of step S30 corresponds to an eighth process.

As shown in FIG. 3, when the CPU 21 displays the image on the display screen 31, the process proceeds to step S40. In step S40, CPU 21 determines whether or not the user has given an instruction to end the display processing. When the operation information corresponding to the user touching the seventh image E7 is not received, the CPU 21 determines that the user does not instruct the end of the display processing (step S40: NO). In this case, the CPU 21 advances the process to step S50.

In step S50, the CPU 21 determines whether or not the user has instructed to change the set charging time H. When the set charging time H corresponding to the user touching the third image E3 is received, the CPU 21 determines that there is an instruction to change the set charging time H (step S50: YES). In this case, the CPU 21 advances the process to step S60. In step S60, the CPU 21 sets the received set charging time H as a new set charging time H for calculating the set charge information J in step S20. Thereafter, the CPU 21 returns to the processing of step S10. The process of step S50 is a fifth process.

On the other hand, in step S50, when the set charging time H is not received, the CPU 21 returns to the processing of step S10 as it is. When returning to the process of step S10, the CPU 21 executes the series of processes after step S10 again. CPU 21 repeats a series of processing until the determination in step S40 becomes YES. During this time, for example, the current position of the vehicle 80 in the first image E1 is updated as needed. When the determination in step S40 becomes YES, that is, when the operation information corresponding to the operation of the end button is received, the CPU 21 ends the display processing. Accordingly, the CPU 21 ends the display of each image on the display screen 31.

This embodiment provides the following advantages.

(1) When executing the display process, the CPU 21 displays the set charge information J together with the position information of the specified station on the display screen 31. As a result, the user can grasp to what extent the charge level S can be recovered at which charging station and to what extent the cruising distance can be secured. By obtaining this information, the user can easily make a subsequent travel plan of the vehicle 80.

(2) Even if the charge level S of the battery 82 is the same, the amount of electric power that can be output by the battery 82 varies depending on the degree of deterioration of the battery 82 and the temperature of the battery 82. Therefore, the travelable distance D for the same charge level S is also different. In the present embodiment, the travelable distance D is calculated in consideration of the degree of deterioration of the battery 82 and the difference in the travelable distance D depending on the current temperature of the battery 82. Thus, the travelable distance D can be accurately calculated.

(3) The amount of power supplied varies depending on the charging station. In the present embodiment, the estimated increase amount $\Delta S$ is calculated in consideration of the power supply amount in each charging station. Thus, the estimated increase amount $\Delta S$ can be accurately calculated.

(4) In the present embodiment, the third image E3 is displayed on the display screen 31. The third image E3 allows the user to select the set charging time H by touching the third image SL. Therefore, convenience for the user is enhanced.

(5) In the present embodiment, information on the necessary time N can be provided to the user through the display of the first option image G1. Thus, the user can grasp the minimum time during which the user should stay at the charging station in order to cause the vehicle 80 to travel to the destination.

The above-described embodiment may be modified as follows. The embodiment and the following modified examples may be combined within a scope in which the combined modified examples remain technically consistent with each other.

The configuration of the image displayed on the display screen 31 is not limited to the example of the above embodiment. For example, the first image E1 may be omitted. In this case, the position coordinates of the specified station may be displayed in the second image E2. The image displayed on the display screen 31 may be any image as long as the set charge information J and the position information of the specified station can be grasped.

The information on the charging station may include, for example, a name or an address of the charging station. In the second image E2, the set charge information J of the plurality of specified stations may be arranged in the order of Japanese syllabary or alphabetical order of the names or addresses of the specified stations instead of being arranged in the order of proximity to the current position of the vehicle 80.

When the user considers charging at a charging station, if the user can grasp information on the position of the charging station and the time required to charge the battery 82 to the specific charge level S at the charging station, the user can easily make a subsequent traveling plan. From this point of view, for example, the time taken to charge the battery 82 to the specific charge level S may be displayed on the display screen 31. At this time, an image such as an icon may be displayed on the display screen 31 so that the user can select a specific charge level S.

The radius of the virtual circle may be a fixed value, or a range different from the virtual circle may be set as the target region.

The calculation of the necessary time N and the maximum time M and the display of images related thereto are not essential. Calculation of one of the necessary time N and the maximum time M may be omitted, or calculation of both may be omitted.

The display of the third image E3 may be omitted. That is, it is not necessary for the user to select the set charging time H.

Regarding the calculation of the estimated increase amount $\Delta S$, the correction by the first correction coefficient may be omitted.

The index of the degree of deterioration of the battery 82 may be any one of an integrated value of a current flowing through the battery 82, an integrated value of a charging time of the battery 82, an integrated value of a discharging time of the battery 82, and an integrated value of a travel distance using the battery 82, in addition to the number of elapsed days. A combination of two or more of these may also be used. The degree of deterioration increases as the integrated value of the current increases, as the integrated value of the charge time and the discharge time of the battery 82 increases, and as the integrated value of the travel distance increases.

Regarding the calculation of the travelable distance D, the correction using the second correction coefficient may be omitted.

It is not essential to adopt all three of the estimated increase amount ΔS, the estimated charge level F, and the travelable distance D as the set charge information J. The set charge information J may include at least one of these.

An input device for inputting a user's instruction to the control module 20 may be provided separately from the display device 30. For example, a push switch may be adopted as the input device.

The display device 30 is not limited to a vehicle-mounted display device. For example, the display device may be a mobile terminal such as a smartphone owned by the user. In this case, various kinds of information may be output from the control module 20 to the portable terminal.

The charge management device 10 may not be mounted on a vehicle. For example, a mobile terminal of a user may constitute the execution device and the storage device of the charge management device 10. Then, various kinds of information may be output from the mobile terminal to the in-vehicle display device 30. The mobile terminal constituting the charge management device may display information on its own display screen.

Part or all of the storage device may be located outside the vehicle 80. The storage device in this case may be configured by cloud storage or the like. Even when the storage device is located outside the vehicle 80, the execution device may acquire necessary information from the storage device via an external communication line network.

The execution device may be a server located outside the vehicle 80.

The execution device is not limited to a CPU that executes software processing. For example, at least part of the processes executed by the software in the embodiment may be executed by a dedicated hardware circuit executing hardware processes (such as ASIC). More specifically, the execution device and the storage device may have any one of the following configurations (a) to (c). Configuration (a) includes a processor that executes all of the above-described processes according to programs and a program storage device such as a ROM that stores the programs. Configuration (b) includes a processor and a program storage device that execute some of the above-described processes in accordance with the programs and a dedicated hardware circuit that executes the remaining processes. Configuration (c) includes a dedicated hardware circuit that executes all of the above-described processes. Any number of software execution devices, each including a processor and a program storage device, may be provided. Also, any number of dedicated hardware circuits may be provided. That is, the above-described processes may be executed by processing circuitry that includes one or more software execution devices and/or one or more dedicated hardware circuits. The program storage device, that is, a computer readable medium, includes any medium that can be accessed from a general-purpose computer or a dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A battery charge management device configured to manage a battery for driving a vehicle, the battery being configured to be charged by an external power supply at a charging station, the battery charge management device comprising:
    processing circuitry;
    a storage device;
    a display device; and
    an input device, wherein
    the storage device stores in advance map data including position information of a plurality of charging stations and a correspondence relationship between a charge level of the battery and a charging time of the battery,
    the processing circuitry is configured to execute:
        a first process that retrieves, from the map data, two or more of the charging stations located in a predetermined target area including a current position of the vehicle, the two or more of the charging stations being two or more specified stations;
        a second process that calculates set charge information for each of the two or more specified stations based on the correspondence relationship, the set charge information for each of the two or more specified stations being charge information obtained based on an assumption that the battery has been charged at corresponding one of the two or more specified stations for a selected set charging time, the set charging time being the same for the two or more specified stations;
        a third process that outputs on the display device the set charge information together with the position information of the two or more specified stations;
        a fourth process that causes the display device to show an image for selecting, using the input device, one of a plurality of times that differ from each other as the set charging time for the two or more specified stations; and
        a fifth process that receives the set charging time selected using the input device,
    the charge information includes at least one of an estimated increase amount of the charge level of the battery, an estimated charge level of the battery after charging, and a travelable distance of the vehicle corresponding to the estimated charge level.

2. The battery charge management device according to claim 1, wherein
    the vehicle includes a device configured to detect a temperature of the battery,
    the processing circuitry is configured to calculate a deterioration level of the battery, the charge information includes the travelable distance, and the processing circuitry is configured to decrease an increase range of the travelable distance with respect to the set charging time as the deterioration level of the battery is increased, and also decrease the increase range of the travelable distance with respect to the set charging time as the temperature of the battery is decreased during execution of the second process.

3. The battery charge management device according to claim 1, wherein the map data includes information on a power supply amount being an amount of power supplied to the battery from the external power supply at each of the charging stations per unit time, the charge information includes the estimated increase amount, and the processing circuitry is configured to increase the estimated increase amount with respect to the set charging time as the power supply amount of the two or more specified stations is increased.

4. The battery charge management device according to claim 1, wherein the processing circuitry is configured to execute:

a sixth process that calculates a necessary charge level needed by the vehicle for traveling to a destination of the vehicle from the two or more specified stations being a start point;

a seventh process that calculates a necessary time taken to increase the charge level of the battery to the necessary charge level using the external power supply at the two or more specified stations being the start point in the sixth process; and an eighth process that outputs the necessary time calculated in the seventh process.

5. The battery charge management device according to claim 1, wherein the display device includes the input device.

6. The battery charge management device according to claim 1, wherein, when there is no charging station in the target area, the processing circuitry is configured to cause the display device to display a message of no charging station.

7. The battery charge management device according to claim 1, wherein the processing circuitry is configured to cause the display device to display:

a first image showing a road existing around the vehicle and the position information of the two or more specified stations, a second image showing the set charge information of the two or more specified stations in a form of a table and arranged in order of proximity to the current position of the vehicle, and a third image which is the image for selecting the set charging time, the third image comprising a line and a point movable on the line.

8. The battery charge management device according to claim 7, wherein the processing circuitry is configured to cause the display device to further display at least one of:

a first option image showing necessary time of the two or more specified stations in a form of a table and arranged in order of proximity to the current position of the vehicle, wherein the necessary time is time taken to increase the charge level of the battery to a necessary charge level needed by the vehicle for traveling to a destination of the vehicle from the two or more specified stations being a start point, or a second option image showing maximum time of the two or more specified stations in a form of a table and arranged in order of proximity to the current position of the vehicle, wherein the maximum time is time taken to increase the charge level of the battery to a charging capacity of the battery.

9. The battery charge management device according to claim 8, wherein the processing circuitry is configured to cause the display device to further display at least one of:

a fourth image including an icon for instructing display of the necessary time, a fifth image including an icon for instructing display of the maximum time, or a sixth image including an icon for instructing to delete the third image to the fifth image from the display device.

10. A battery charge management device configured to manage a battery for driving a vehicle, the battery being configured to be charged by an external power supply at a charging station, the battery charge management device comprising:

processing circuitry;

a storage device;

a display device; and an input device, wherein the storage device stores in advance map data including position information of a plurality of charging stations and a correspondence relationship between a charge level of the battery and a charging time of the battery, the processing circuitry is configured to execute:

a first process that retrieves, from the map data, two or more of the charging stations located in a predetermined target area including a current position of the vehicle, the two or more of the charging stations being two or more specified stations;

a second process that calculates set charge information for each of the two or more specified stations based on the correspondence relationship, the set charge information for each of the two or more specified stations being charge information obtained based on an assumption that the battery has been charged at corresponding one of the two or more specified stations for a set charging time, the set charging time being the same for the two or more specified stations;

a third process that outputs on the display device the set charge information together with the position information of the two or more specified stations;

a fourth process that causes the display device to show an image for selecting, using the input device, one of a plurality of times that differ from each other as a new value of the set charging time for the two or more specified stations;

a fifth process that receives the set charging time selected using the input device; and repeating the first through fourth processes to recalculate and display the set charge information based on the selected new value of the set charging time, the charge information includes at least one of an estimated increase amount of the charge level of the battery, an estimated charge level of the battery after charging, and a travelable distance of the vehicle corresponding to the estimated charge level.

* * * * *